3,277,129
PROCESSING OF AGAVE LEAVES TO RECOVER WAXES AND FIBER

Menachem Lewin, Rehov Hillel, Otto Elsner, Rehov Uruguay, Michael Mielcharek, Shikun, and Tamar Bernstein, Rehov Uruguay, Jerusalem, assignors to the State of Israel, Jerusalem, Israel
No Drawing. Filed Oct. 22, 1962, Ser. No. 232,246
Claims priority, application Israel, Nov. 19, 1961, 16,339
13 Claims. (Cl. 260—412.8)

The present invention concerns an integrated process for the working up of agave leaves with the object of isolating therefrom a number of commercially valuable products. The products recovered in accordance with the present invention are either utilizable in the form in which they are obtained or are semi-finished crude products which may be submitted to further purification, beneficiation or chemical conversion.

It is known that the leaves of the agave plant serve as a source of sisal fibres. These fibres constitute, however, only 2–5% by weight of the leaves and in all known processes for the isolation of these fibres the remaining 95–98% of the agave leaves, including the juice and flesh, is discarded as waste.

Attempts have been made to utilize the flesh of the agave leaves for the preparation of animal feed. These attempts have, however, so far been unsuccessful mainly because of the difficulties encountered in the separation of the flesh proper, which contains the nutritive substances, from the cellulosic matter and other non-nutritive components of the leaves.

It is also known that the juice of the agave leaves contains various valuable materials such as, for example, vitamins, saponins, chlorophyll and waxes. However, apart from the recovery of hecogenin from the juice, no successful attempts have been reported to recover on a commercial scale valuable products from the non-fibrous components of the agave leaves.

The total flesh of the agave leaf, i.e. all the solid matter that remains after the removal of the juice and the long fibres, forms in the dry state 17–35% by weight of the dry matter of the leaf and contains the following parts of the plant:
  (1) Epidermis.
  (2) Chloroplast layer.
  (3) Internal plant tissue.
  (4) Short fibres (up to 50 cm. long).
  (5) Inorganic and organic compounds.

The proportion of the epidermis in the flesh varies from 20–30% by weight. The epidermis contains about 20% by weight of ash, 5–10% of waxes and resins, 50–60% of hydrocarbons and 10–20% of hemicelluloses and glucosides, and is valueless from a nutritive point of view as are also the short fibres.

The chloroplast of the leaf forms a layer about 0.5 mm. thick beneath the epidermis. It contains 0.05–0.07% by weight of chlorophyll, 0.04–0.06% of carotenoids of which 0.002–0.004% is β-carotene, about 2–4% of fats, 3–6% of proteins, 6–13% of ash and 30–40% of glucosides, sugars and celluloses. The cellulose content of the chloroplast layer depends on the amount of short fibres contained therein and varies between 16–22% by weight. In addition to the substances enumerated above, the chloroplast layer also contains as a rule vitamins, organic acids and water-soluble salts.

Below the chloroplast (in the original leaf) there is located an inner tissue free of pigments and consisting mainly of carbohydrates (almost 50% by weight) as well as of some other substances identical with some of those contained in the chloroplast layer, including about 15–20% by weight of α-cellulose.

Hereinafter the chloroplast layer and the internal tissue will be referred to together as non-epidermic flesh, as distinct from the total flesh.

From the above it becomes evident that the agave leaves may be broken down into the following valuable components:
  (1) Long fibres or sisal fibres;
  (2) Juice utilizable as starting material for the recovery of various saponins, vitamins, chlorophyll and the like;
  (3) The epidermis which may serve as starting material for the recovery of various waxes by suitable extraction procedures;
  (4) Short fibres which may be utilized in upholstery;
  (5) The non-epidermic flesh which, if desired, may serve as starting materials for the recovery of some of its components or, alternatively, may be utilized as such as animal feed.

As will be shown more particularly below, it is possible in accordance with the invention to separate the epidermis from the non-epidermic flesh in order to utilize each of these components separately. However, this separation of the total flesh into epidermis and non-epidermic flesh, although preferable is not always necessary and constitutes accordingly an optional feature of this invention. If desired, the total flesh may be used without prior separation of the epidermis as animal feed either directly or after submission to suitable extraction operations for the removal of waxes. The non-epidermic flesh is particularly suitable as an additive to chicken feed to which it may be admixed in a proportion of, for example, 5–25% by weight.

The integrated process according to the invention for the recovery of valuable products from the leaves of the agave plant comprises the steps of submitting the leaves to a crushing and squeezing operation for the removal of the long fibres (decortication), recovering separately from the remaining pulp the total flesh, short fibres (less than 0.5 m. long) and juice and, if desired, submitting the total flesh to a treatment for the separation of the epidermis from the non-epidermic flesh.

The separation of the pulp remaining after decortication into short fibres, flesh and juice may be effected by first recovering the short fibres followed by a separation of the flesh from the juice, or by first recovering pure juice and then separating the short fibres from the flesh.

In a preferred embodiment of the invention part of the juice isolated from the pulp remaining after the decortication is recycled for rinsing the flesh/juice mixture from the decorticated fibres. In known decortication processes this rinsing is effected with water which results in a considerable dilution of the squeezed-out juice. However, when the juice serves as starting material for the recovery of the various valuable compounds contained therein, excessive dilution of the juice makes subsequent recovery steps more difficult and should, therefore, preferably be avoided. This is achieved in accordance with a preferred embodiment of the invention by recycling part of the juice and using it for the rinsing.

The epidermis or the total flesh, as the case may be, may be submitted to extraction operations for the recovery of waxes. These extraction operations may, if desired, also be embodied into the integrated process according to the invention and form part of it.

The various steps of the integrated process according to the invention will now be described in some more detail.

Isolation of the long fibres

The so-called decortication of the leaves is effected as known per se, by crushing the leaves with a mill-like apparatus usually referred to as "decorticator." This apparatus crushes the entire mass of the leaves, leaving intact the long fibres only, the crushed mass being removed from the residual long fibres by rinsing. As mentioned previously, this rinsing is in accordance with a preferred embodiment of the invention effected with part of the recycled juice.

*Separation of the juice from the total flesh and short fibres*

This separation is effected by simple conventional mechanical operations such as filtration through a suitable sieve, straining through a cloth, centrifugation or the like. Two or more different operations may be used in combination. When the term "mechanical separation" is used in the claims, operations such as filtration, straining, centrifugation and like operations either alone or in combination are contemplated.

*Separation of the short fibres (less than 0.5 m. long) from the total flesh*

The mass obtained after the separation of the juice consists of total flesh and short fibres. For the separation of the short fibres it is possible to slurry the total flesh with the short fibres in water and to remove the fibres by means of, for example, revolving rakes dipping into the pulp thereby fishing the fibres out of the latter. Alternatively, it is also possible to use, for example, a somewhat slanted drum sieve divided into sectors of gradually increasing mesh-size so arranged that the sector with the smallest meshes is disposed near the upper, feeding end while that with the largest meshes is near the lower, discharge end. When the mixture of flesh and short fibres, either dry or slurried in water, is introduced into the revolving drum the fibres ball as they proceed while the flesh passes through the sieve.

If desired, the sequence of operations for the separation from each other of the juice, the flesh and the short fibres may be reversed. In this case, the short fibres are first recovered from the pulp remaining after the decortication and isolation of the long fibres, e.g. by any of the means referred to above, and only then the remaining pulp is filtered, strained or centrifuged in order to separate the flesh and juice from each other.

By means of the above operations the original agave leaves are resolved into long fibres, short fibres, juice and total flesh. Experiments have given the following average amounts for these individual components:

| | Percent |
|---|---|
| Long fibres, dry matter | 3.0 |
| Short fibres, dry matter | 0.9 |
| Juice | 63.5 |
| Total flesh, dry matter | 3.0 |

Mechanical losses and removal of water from the flesh account for the remaining 28.4%.

As pointed out above, the total flesh may be utilized as a feed additive, preferably after prior removal of the waxes. It is further preferred to separate the epidermis from the total flesh which has the double advantage that on the one hand non-nutritive matter is in this manner removed from the flesh rendering the remaining raffinate richer and more valuable as animal feed, while on the other hand the pure epidermis contains the bulk of the waxes and thus serves as good starting material for the recovery of the latter.

*Separation of the epidermis from the total flesh*

The epidermis can be separated from the non-epidermic flesh by either wet or dry processes.

The wet processes are based on the observation that the epidermis is hydrophobic while the non-epidermic flesh is hydrophylic. Accordingly, a dispersion of the total flesh in an aqueous medium can be so treated that the non-epidermic flesh settles while the epidermis floats on the surface. Processes of this kind will be referred to hereinafter for short as "flotation." If desired, the collection of the epidermis on the surface may be facilitated by the addition of relatively small amounts of water-immiscible organic solvents, such as benzene.

Another wet separating process consists in suspending the flesh in water or an aqueous liquor, shaking or otherwise temporarily intimately mixing the aqueous suspension with a water-immiscible solvent and allowing the two phases to separate. The epidermis passes into the non-aqueous phase while the non-epidermic flesh remains in the aqueous phase from which it is recovered. Processes of this kind will hereinafter be referred to for short as "extraction."

The dry processes are based on the differences in the dielectric constants of the epidermis and the non-epidermic flesh and on the observation that friction applied to the dry, comminuted total flesh, e.g. by transport in a stream of dry air, generates a negative electric charge on the epidermis. When the non-epidermic flesh is sufficiently dry it assumes at the same time a positive charge; otherwise it remains uncharged. Alternatively, the charge on the epidermis can also be produced by the use of so-called corona discharge electrodes or any other suitable means. When the epidermis and possibly the non-epidermic flesh are electrically charged as specified, the mixture of epidermis and non-epidermic flesh is passed through an electrostatic field, e.g. between two condenser plates or between oppositely charged drums revolving in opposite directions (drum collector), whereby the epidermis is attracted to the positive pole and collects on or near it while the non-epidermic flesh is attracted to the negative pole or remains unaffected, as the case may be. (For the description of such a drum-condenser—see George Granger Brown and Colab, "Unit Operations," John Wiley & Sons, Inc., New York, Chapmann & Hall Limited, London, 1950, Electrostatic Classification, pages 96/97.)

Where the epidermis is isolated in either of the ways outlined above it may serve for the recovery of various waxes. The waxes may, however, also be recovered from the total flesh, i.e. without separation of the epidermis though this procedure is less advantageous. As already mentioned previously, the recovery of waxes from the epidermis or the total flesh, as the case may be, may be incorporated into the integrated process according to the invention. There follows, accordingly, a brief description of such recovery.

*Recovery of Waxes*

According to one procedure the total flesh or the epidermis, as the case may be, is submitted to successive extractions by a number of different solvents. An example of such a sequence of solvents is petroleum ether, acetone, benzene, carbon tetrachloride, ethyl alcohol. This method will hereinafter be referred to as the "fractionated extraction."

According to a second method, the starting material is submitted to what will be referred to hereinafter as "exhaustive extraction," i.e. extraction by a solvent capable of dissolving all the various wax fractions contained in the starting material. From the extract thus obtained the solvent can then be removed, e.g. by vacuum evaporation, by spray evaporation or by any other suitable method.

Finally, it is also possible to combine the above two methods by first submitting the starting material to exhaustive extraction, removing the solvent and then submitting the residue to fractionated extraction. This method will hereinafter be referred to as the "combined method."

In the fractionated extraction it is possible, for example, to start with a low boiling hydrocarbon such as petroleum ether, hexane, heptane, octane or the like. By extraction with such a solvent there is usually obtained a wax fraction which has an intense yellow colour owing to co-extracted carotenoids. This wax fraction has a waxy consistency and melts between 68 and 73° C.

The consistency of the wax obtained in such an extraction depends to a certain extent on the nature of the extractant. When using, for example, cyclohexane, a yellow, fat-like grease is obtained which melts between 65 and 71° C.

A subsequent extraction step may be effected, for example, with acetone as extractant or with other aliphatic and alicyclic ketones. This extraction yields as a rule a light yellow waxy substance melting at 81–86° C. The extract is a typical wax which contains, however, a number of impurities such as chlorophyll and some glucosides which can be removed by methods known per se.

A further fraction can be obtained by extraction with benzene or some other aromatic solvent such as toluene or xylene. The fraction obtained by this extraction can as a rule be subdivided into two fractions: a white powder which amounts to about 30% and which melts from 90° C. upwards with polymerization and conversion into a solid insoluble mass, and yellow waxes melting at 92–97° C.

If the residue remaining after extraction with benzene or another aromatic hydrocarbon solvent is extracted with a chlorinated paraffin, such as carbontetrachloride, a light yellow resin is obtained which melts from 90° C. upwards with polymerization and conversion into a solid insoluble mass.

Further extraction of the residue with a lower monovalent alcohol does not, as a rule, yield any more waxes.

Examples of solvents suitable for use in the exhaustive extraction method are lower aliphatic alcohols, tetrahydrofurane, N,N-dimethylformamide, furfural, turpentine. In the exhaustive extraction some impurities are as a rule co-extracted with the waxes. The proportion of the coextracted impurities depends on the nature of the extractant. Thus, for example, ethyl alcohol and N,N-dimethylformamide extract chlorophyll and various glucosides together with the waxes. Against this, tetrahydrofurane extracts a much smaller proportion of glucosides; so does furfural, but the latter has the disadvantage of having a comparatively high boiling point, which renders its removal from the extract more difficult.

In accordance with the combined method the starting material is first submitted to an exhaustive extraction, e.g. with benzene. The extractant is then evaporated and the residue submitted to fractionated extraction with various extractants, e.g. petroleum ether, a mixture of petroleum ether and methanol and finally pure methanol. By proceeding, for example, in this manner and using the above solvents in the above sequence there is obtained a first wax fraction containing also a considerable amount of fats and pigments, two further wax fractions which differ from each other by their melting points, and a resinous residue. The latter may be heated to 120° C. and maintained at this temperature whereupon it undergoes polymerization. Any residual waves may then be extracted from the polymer. Alternatively, it is also possible to heat the resinous residue rapidly to a temperature above 150° C. Under these conditions the resin which would polymerize at 120° C. loses its capacity to polymerize.

It should be noted that the waxes, important as they may be, are to be considered as by-products in the process according to the invention and that much more valuable products are obtainable by proper working up of the flesh and the juice of the agave leaves. With due consideration to this subsequent working-up, the recovery of the waxes from the epidermis or the total flesh, as the case may be, should be rendered as simple as possible and the starting material should be submitted to as few as possible operations. Accordingly, it will generally be preferred to submit the starting material to an exhaustive extraction with a solvent for all or the majority of the waxes contained in the starting material. Such solvent should preferably be selective in that it should not coextract the other non-waxy valuable substances to be recovered in a following stage such as, for example, saponins and sapogenins. An example of such a selective extractant for all or most of the waxes is benzene.

According to a modification of the above outlined operations it is possible to combine the so-called extraction of the epidermis with the exhaustive extraction therefrom of the waxes. This may be achieved by mixing the flesh with a non-polar solvent for all the waxes together with water or a water-alcohol mixture whereupon the epidermis (containing the waxes) passes into the non-polar layer where the waxes are at the same time extracted. In this manner two layers are obtained, an upper lipophylic one comprising the solvent with the waxes dissolved and the extracted epidermis suspended therein, and a lower aqueous one comprising the non-epidermic flesh in suspension and dissolved therein the saponins and sapogenins as well as other glycosides, sugars, pigments and the like.

The invention is illustrated by the following examples to which it is not limited.

EXAMPLE 1

Freshly cut agave leaves, of an average length of 100 cm., were squeezed out between oppositely revolving rollers and a mixture of flesh and juice amounting to 67% of the weight of the leaves was collected.

The mixture was strained through a 40-mesh sieve and 51.4% juice and 11.1% of flesh (calculated on the weight of the fresh leaves) were obtained separately. The flesh was centrifuged and some more juice thereby separated, which was combined with the juice separated in the sieve. In the result, the mixture yielded 56.6% of juice and 5.2% of flesh. The flesh contained 79% of water. Its dry matter amounted to 1.26% of the weight of the fresh leaves.

The leaf skeleton was subjected to a crushing operation which yielded 3.5% of long fibres (calculated as dry matter on the weight of the fresh leaves) containing a small proportion of residual flesh, and 19.1% of a pulp of flesh and short fibres diluted with flushing water.

From the pulp an amount of 0.9% of short fibres (calculated as dry matter on the weight of the fresh leaves) was fished out with rakes. These fibres contained residual flesh amounting to 5% of the dry weight of the fibres. Then the flesh was recovered from the pulp; it contained 81.5% of water. Its dry matter amounted to 3.12% of the weight of the fresh leaves.

The flesh contained about 0.5% of its own weight of short fibres.

The overall yield, calculated on the weight of the fresh leaves, was:

| | Percent |
|---|---|
| Juice | 56.6 |
| Flesh from squeezing operation | *1.26 |
| Flesh from crushing operation | *3.12 |
| Short fibers (not cleaned) | *0.91 |
| Long fibres (not cleaned) | *3.50 |

* Calculated as dry matter.

EXAMPLE 2

10 kg. of waste mass were withdrawn from a decorticator in the course of a normal run destined for the production of sisal fibres. The waste was placed in a jute sack and then squeezed out in a press yielding 4.9 kg. of flesh, containing 72.6% water. The remainder was a cloudy green juice.

The flesh thus obtained was disintegrated by hand and sieved through a drum sieve comprising a succession of sieves of 20, 10 and 6 mesh. The sievings were dried at 90° C., and in this manner 320 g. of short fibres and 970 g. of flesh were obtained.

EXAMPLE 3

32 kg. of agave sisalana leaves of 1 m. average length were squeezed, crushed and the long fibres were separated. The flesh thereby obtained was gradually introduced into a trough filled with juice previously obtained and the short fibres floating in the trough were fished out. Altogether 303.3 g. of short fibres were thus separated which corresponds to a yield of about 17.4% calculated as dry matter on the dry matter of the flesh. The mixture of flesh and juice was run to the bottom of a flotation cell of 1-litre working volume, conical in shape and provided with a propeller-type stirrer capable of revolving at 1400 r.p.m. Compressed air was then introduced into the cell, and thereafter the mixture was led to a settling vat of 6-litre capacity provided near its bottom with a 30-mesh sieve. In this vat the non-epidermic flesh was retained by the sieve while the mixture of juice and water was drained off. The rate of introduction of the mixture into the flotation cell was kept in equilibrium with the rate of discharge of liquid from the vat so that the latter always remained filled up. At the same time the epidermis, which is hydrophobic, was driven by the air bubbles to the surface of the liquid where it collected as a scum and from where it was removed by means of a scoop. Part of the liquid drained off from the settling vat was recirculated for the processing of another batch of flesh.

The flotation of the non-epidermic flesh was repeated four times, and after the fourth flotation, the collected flesh was centrifuged and dried. In this manner altogether 1080 g. of dry non-epidermic flesh was obtained, which could be used as a chicken-feed additive.

The separated epidermis amounted to 280 g. which corresponded to 76% of the total amount of epidermis contained in the total flesh. Mechanical losses occurring during the process and substances dissolved in water during flotation account mainly for the remaining 24%.

EXAMPLE 4

5.6 kg. of agave sisalana leaves were squeezed and crushed, and the flesh remaining after the removal of the long fibres was separated from the short fibres and dried as described in Example 1.

The flesh was then intimately mixed with half its weight of a 1:1 w./w. kerosene-water mixture. The mixing operation was continued for 30 minutes, then the phases allowed to separate. The flesh collected on the bottom of the vessel beneath the aqueous phase, while the epidermis collected in the kerosene phase. After the separation of the kerosene layer the aqueous layer was stirred or shaken in order to suspend the flesh, then the mixture was strained through a 30-mesh sieve, and the residue was washed and dried by centrifugation. In this manner 165 g. of nonepidermic flesh was obtained, which could be used as a chicken-feed additive.

From the jelly-like kerosene layer the solvent was removed by centrifugation and the remaining epidermis amounted to 94.5% of the theoretical yield.

Similar results were obtained when the kerosene was replaced by xylene.

The process described in this example was also modified for continuous operation. For this purpose an apparatus consisting of three vessels was used. In the first of these the flesh was dispersed in a water/juice/solvent mixture, and the dispersion was conducted to the second vessel where the flesh was allowed to settle; the supernatant liquid with the epidermis dispersed therein was then conducted to the third vessel which contained a 40-mesh sieve, which retained the epidermis while the liquid which passed the sieve was recirculated to the first vessel.

If desired, the pH of the non-epidermic flesh may be adjusted to pH 7–8.5 by neutralizing the acids contained therein at any desired stage of the process by the addition of solid sodium carbonate or a concentrated aqueous solution thereof, slaked lime, dicalcium phosphate or the like. Such an adjustment of the pH is desirable in particular when the non-epidermic flesh is used as additive to chicken feed.

EXAMPLE 5

6.5 kg. of agave sisalana leaves of 1 m. average length were squeezed and crushed and the long fibres separated. The remaining pulp which contained the short fibres was squeezed to separate the juice and thereafter sieved through a drum sieve where the short fibres were retained.

The wet flesh was centrifuged, dried in a stream of air at 70° C. and comminuted so as to pass through a 40-mesh sieve. The flesh was then blown by means of a stream of dry air to a cyclone. The friction occurring in this blowing operation produced negative electric charges on the individual particles of the epidermis and positive charges on the particles of the non-epidermic flesh. After emerging from the cyclone the particles were allowed to drop between two vertical condenser plates spaced 4 cm. from each other, between which a potential difference of 10,000 volts existed. The epidermis collected below the anode while the non-epidermic flesh tissues collected below the cathode. In this manner 222 g. of a non-epidermic flesh and 46 g. of epidermis were obtained.

EXAMPLE 6

Dry, powdered agave flesh (total) obtained in accordance with Example 1 was submitted to fractionated extraction with the following solvents in the sequence indicated: benzine (B.P. up to 60° C.), petroleum ether (B.P. up to 50° C.), acetone, benzene, carbon tetrachloride, ethanol. The waxes obtained in each fraction as well as their appearance and melting points are given in the following table:

| Solvent | Extract in percent by weight of the dry agave leaf material | Description of extract | Melting point |
| --- | --- | --- | --- |
| Benzine | 2.32 | Yellow grease | |
| Petroleum ether | 0.21 | do | |
| Acetone | 0.80 | Yellow, hard | 81.0 |
| Benzene | 0.97 | (a) Yellow wax; (b) white powder. | 95.3 |
| Carbon tetrachloride. | 0.21 | Yellow powder | 94.8 |
| Ethanol | 20.0 | Yellow-brown crystalline mass. | |

EXAMPLE 7

Powdered flesh (total) af agave leaves obtained in accordance with Example 1 was first submitted to exhaustive extraction with ethyl alcohol, the alcohol was then evaporated from the extract obtained and the residue submitted to fractionated extraction with benzine, petroleum ether, acetone, benzene and carbon tetrachloride in that sequence. The results are given in the following table:

| Solvent | Extract in percent by weight of the dry agave leaf material | Description of extract | Melting point |
| --- | --- | --- | --- |
| Benzine | 2.15 | Yellow grease | |
| Petroleum ether | 0.25 | do | |
| Acetone | 0.78 | Green, hard wax | 82.2 |
| Benzene | 0.96 | Yellow wax | 94.5 |
| Carbon tetrachloride. | 0.23 | Yellow powder | 94.0 |

EXAMPLE 8

Flesh of agave leaves was separated from the epidermis by the flotation method described in Example 3 and the epidermis was submitted to fractionated extraction with benzine, petroleum ether, acetone, benzene, trichloroethylene and ethanol in that sequence. The results are indicated in the following table:

| Solvent | Extract in percent by weight of the dry agave leaf material | Description of extract | Melting point |
|---|---|---|---|
| Benzine | 4.0 | Yellow wax | 68.0 |
| Petroleum ether | 0.28 | do | 70 |
| Acetone | 8.00 | Light yellow hard wax | 85.6 |
| Benzene | 9.30 | do | 96.4 |
| Trichloroethylene | 0.40 | do | 97.1 |
| Ethanol | 2.5 | Yellow brown light-coloured mass. | |

EXAMPLE 9

500 g. of agave flesh (total) obtained in accordance with Example 1, and previously dried at 80° C., was extracted three times with boiling 96% methanol, 2.0 litres of alcohol being taken for the first extraction, and 1.5 litres for each of the succeeding extractions. The extracts were combined and cooled and the precipitate obtained centrifuged off. The precipitate was boiled twice with 0.5 litre of methanol, the resulting extract strained in order to remove any undissolved matter and then cooled. The resulting precipitate was centrifuged off and dried. In this manner 10.5 g. of light greenish-yellow waxes was obtained, melting at 93–98° C.

EXAMPLE 10

The epidermis of the flesh of agave leaves obtained as in Example 3 was submitted to exhaustive extraction with 95% ethanol, the ethanol evaporated in vacuo and the residue submitted to successive extraction with benzine, petroleum ether, acetone, toluene, chloroform and ethanol. The results are indicated in the following table:

| Solvent | Extract in percent by weight of the dry agave leaf material | Description of extract |
|---|---|---|
| Benzine | 3.10 | Yellow wax. |
| Petroleum ether | 0.20 | Do. |
| Acetone | 6.15 | Green hard wax. |
| Toluene | 7.21 | Olive yellow hard wax. |
| Chloroform | 0.30 | Yellow wax. |
| Ethanol | 20.5 | |

We claim:
1. A process which comprises submitting the leaves of the agave plant to a squeezing operation, separating a pulp from the leaf skeletons, recovering separately from said pulp by a mechanical separation the total flesh, juice and fibers that are less than 0.5 m. long, separating the epidermis from the non-epidermic flesh and submitting the epidermis to an extraction operation with at least one solvent for the waxes in said epidermis, and recovering the waxes from said solvent extract.

2. The process according to claim 1 wherein the epidermis is submitted to one single solvent for said waxes.

3. The process according to claim 1 wherein the epidermis is submitted to successive extractions with a number of solvents each of which is a solvent for the waxes in said epidermis.

4. A process which comprises submitting the leaves of the agave plant to a squeezing operation, separating a pulp from the leaf skeletons by a rinsing operation, recovering separately from said pulp by mechanical separation the total flesh, juice and fibers that are less than 0.5 m. long, submitting the total flesh to a treatment in which the epidermis particles assume a negative electric charge and passing the so-charged flesh through an electrostatic field whereby the epidermis is deflected and separated.

5. The process according to claim 4 wherein the epidermis is charged by contacting the dry total flesh with a current of dry gas.

6. The process according to claim 4 wherein the total flesh, after the production of said electric charge, is passed between oppositely charged surfaces whereby the epidermis particles are attracted to the positively charged surface.

7. The process according to claim 4 wherein the total flesh, after production of the electric charge, is passed between oppositely charged surfaces revolving in opposite directions whereby the epidermis particles are attracted to the positively charged surface and are removed thereon.

8. A process in accordance with claim 4, wherein the so-separated epidermis is recovered and submitted to an extraction with at least one solvent for the waxes in said epidermis, and the waxes are recovered from said solvent extract.

9. A process which comprises submitting the leaves of the agave plant to a squeezing operation, separating a pulp from the leaf skeletons by a rinsing operation, recovering separately from said pulp by mechanical separation the total flesh, juice and fibers that are less than 0.5 m. long, introducing the total flesh into a mixture of water and a non-aqueous solvent, agitating the mixture, allowing the phases to separate and recovering the epidermis which has passed into the non-aqueous phase from the non-aqueous phase and the non-epidermis flesh which has passed into the aqueous phase from the aqueous phase.

10. A process in accordance with claim 9, wherein the so-recovered epidermis is submitted to an extraction with at least one solvent for the waxes in said epidermis and the waxes are recovered from said solvent extract.

11. A process which comprises submitting the leaves of the agave plant to a squeezing operation, separating a pulp from the leaf skeletons by a rinsing operation, recovering separately from said pulp by mechanical separation the total flesh, juice and fibers that are less than 0.5 m. long, recycling part of the juice for said rinsing operation of the leaf skeletons, combining the juice returning from the leaves with the bulk of the juice, and crushing the leaf skeletons to recover therefrom the fibers that are more than 0.5 m. long.

12. The process according to claim 11 wherein the fibers that are less than 0.5 m. long are first mechanically removed from said pulp and said total flesh is then separated from said juice by a filtration step.

13. The process according to claim 11 wherein the total flesh is first separated from said pulp by a filtration step, and said fibers less than 0.5 m. long are then mechanically removed from a slurry of said total flesh and fibers.

References Cited by the Examiner
UNITED STATES PATENTS

| | | | |
|---|---|---|---|
| 1,073,591 | 9/1913 | Christensen | 99—2 |
| 1,231,247 | 6/1917 | Freeman | 209—162 X |
| 2,375,142 | 5/1945 | Slelar | 260—412.8 |
| 2,567,179 | 9/1951 | Bonotto | 260—412.8 |
| 2,649,624 | 8/1953 | Brunis | 260—428.5 X |
| 2,729,856 | 1/1956 | Horton et al. | 19—17 |
| 2,926,391 | 3/1960 | Haas | 19—17 |
| 3,069,269 | 12/1962 | Rubin | 99—2 |
| 3,130,034 | 5/1964 | Parker | 99—2 |
| 3,143,492 | 8/1964 | Bullock | 209—127 |

FOREIGN PATENTS 575,642  2/1946  Great Britain.

OTHER REFERENCES

Politzer, Chemistry and Industry, 1948, pp. 408–409.

CHARLES B. PARKER, *Primary Examiner.*

JOSEPH P. BRUST, *Examiner.*

A. H. SUTTO, *Assistant Examiner.*